E. L. A. LERTOURNÉ.
METHOD AND MEANS OF PRODUCING SYNCHRONISM BETWEEN THE ROTATION OF A CONTROLLING MACHINE AND THE ROTATION OF ONE OR MORE ELECTRICALLY DRIVEN MACHINES.
APPLICATION FILED AUG. 24, 1909.
988,792.
Patented Apr. 4, 1911.
2 SHEETS—SHEET 1.
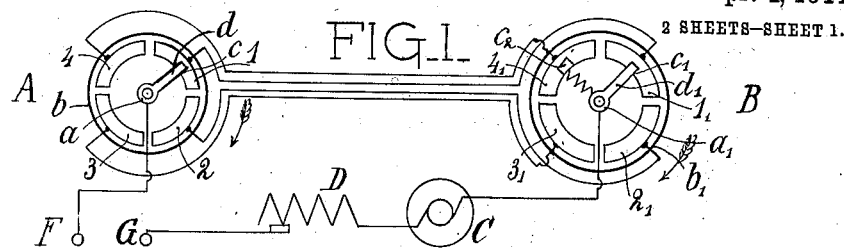
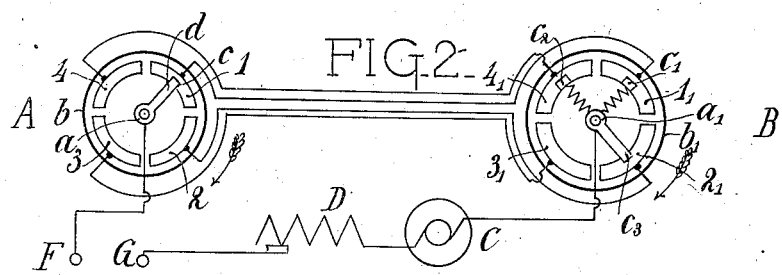
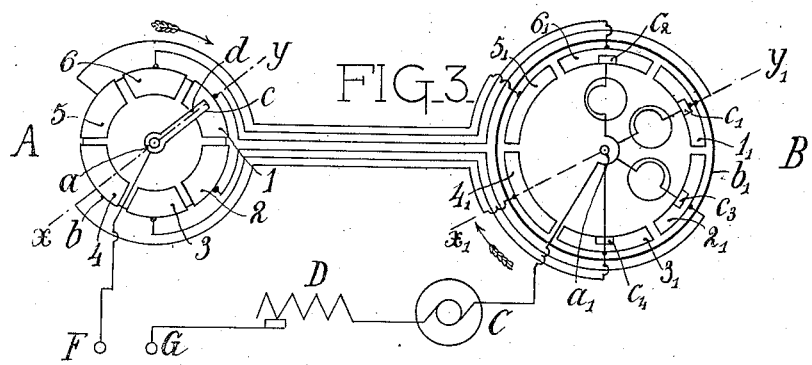
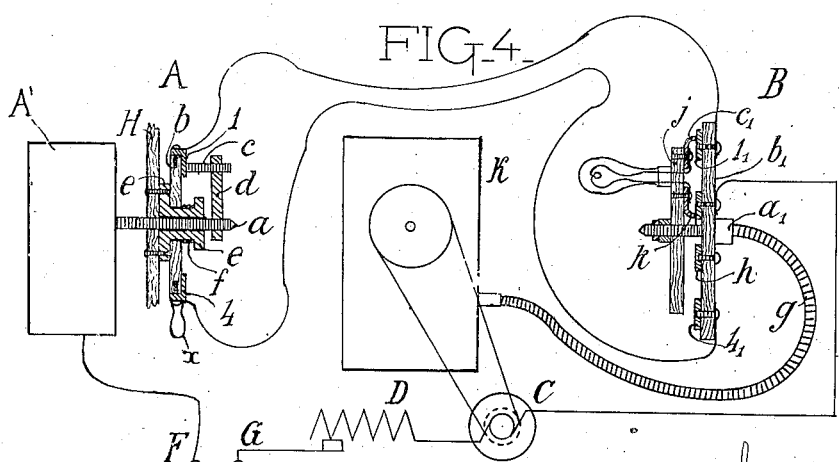
Witnesses
Janet W. Wynkoop.
Ida I. Stanley.
Inventor
Eugène Louis Amédée Lertourné
By Knight Bros
attorneys E. L. A. LERTOURNÉ.
METHOD AND MEANS OF PRODUCING SYNCHRONISM BETWEEN THE ROTATION OF A CONTROLLING MACHINE AND THE ROTATION OF ONE OR MORE ELECTRICALLY DRIVEN MACHINES.
APPLICATION FILED AUG. 24, 1909.
988,792.
Patented Apr. 4, 1911.
2 SHEETS—SHEET 2.
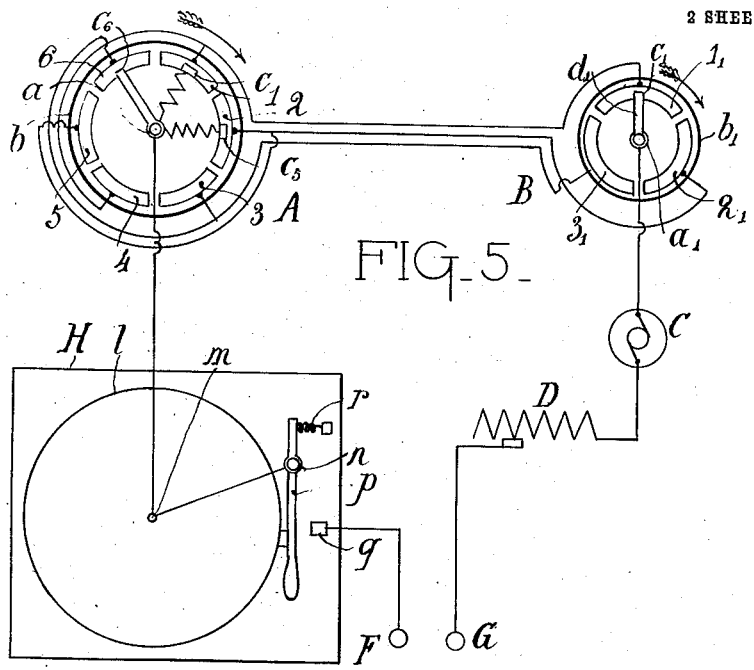
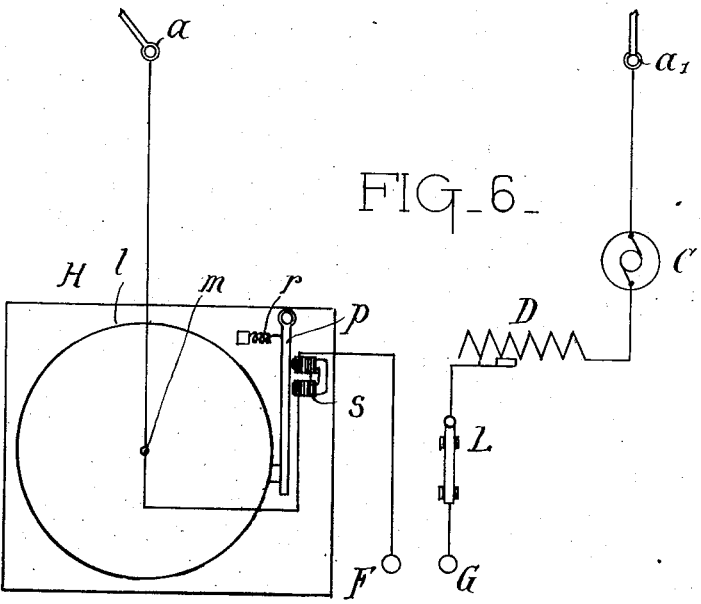

UNITED STATES PATENT OFFICE.

EUGÈNE LOUIS AMÉDÉE LERTOURNÉ, OF ROUEN, FRANCE.

METHOD AND MEANS OF PRODUCING SYNCHRONISM BETWEEN THE ROTATION OF A CONTROLLING-MACHINE AND THE ROTATION OF ONE OR MORE ELECTRICALLY-DRIVEN MACHINES.

988,792.  Specification of Letters Patent.  Patented Apr. 4, 1911.

Application filed August 24, 1909. Serial No. 514,426.

*To all whom it may concern:*

Be it known that I, EUGÈNE LOUIS AMÉDÉE LERTOURNÉ, a citizen of the Republic of France, and resident of 2ᶜ Rue Pavée, Rouen, Seine-Inférieure, in the Republic of France, have invented certain new and useful improvements in methods and means of producing synchronism between the rotation of a controlling-machine and the rotation of one or more electrically-driven machines, of which the following is a specification.

The object of this invention is to synchronize the relation of a controlling machine driven by a motor of any kind and the rotation of one or more dependent machines driven by an electric motor.

This invention consists substantially in directing the electrical current collected by the successive contacts of a rotary distributer of which the rotating part is driven by the controlling machine, into the successive contacts of a rotary receiver of which the rotating part is driven by the controlled machine, the contacts of the receiver, each in turn sending the current to the motor of the dependent machine and thus compelling the latter to adjust its speed to that of the rotating part of the receiver, that is, to progress by successive positions, or from one contact to the next contact.

According to one way of carrying out this invention a current too strong, continuously pushes the brush of the receiver on the next contact which is inoperative. According to another way, the next position, instead of being inoperative, corresponds to a second circuit traversed by a current which is too weak for the synchronous running, thereby rendering the successive shocks less appreciable than in the preceding case. According to a third way, the current normally passes in a circuit regulated for synchronism, while two other circuits, the one having a large resistance and the other a small resistance, return the brush of the receiver into the synchronous position of synchronism so soon as it has moved from such position, the shocks being thus only accidental. According to a fourth way, electrical apparatus which are provided with signals are introduced in the circuits in order to enable the working of the current in the said circuits to be followed and the resistance to be regulated in such a manner that the current shall remain always in the same circuit, thus tending to the suppression of accidental shocks. Further by means of this invention the accidental disturbances of the synchronism are remedied by changing by hand, the position of the rotating part of the receiver or of the distributer in relation to its fixed part. This invention also allows of simultaneously starting and stopping the machines by arranging the movement of the starting lever of the controlling machine to be governed by the interrupter of the current. Finally this invention facilitates the controlling or governing of any desired number of dependent machines by means of a single controlling machine. Each dependent machine is provided with its own electric motor and its own rheostat, its own regulating circuits and its own receiver so that it is merely necessary to connect the contacts of the receiver to the corresponding contacts of a single distributer operated by the controlling machine.

The accompanying diagrammatic drawings illustrate applications of this invention to phonokinematographic synchronism, the kinematograph being in this example the dependent machine.

Figure 1 illustrates the method of controlling by one or by two circuits. Fig. 2 illustrates the method of controlling by three circuits. Fig. 3 represents an apparatus provided with incandescent lamps. Fig. 4 shows sections of devices comprised in Fig. 3, and the connections between the devices, and Fig. 5 shows a distributer fitted with movable resistances and having a number of contacts other than the number of contacts of the receiver. Besides, Fig. 5 shows how both machines are simultaneously started by the working of the stop brake lever of the controlling machine. Fig. 6 shows how both machines are simultaneously started by the working of the interrupter of the motor driving the dependent machine.

In all the figures: A is the distributer, B the receiver, C the electric motor, D the rheostat, F, G the terminals receiving the current supplied from any source; $a$ is a shaft driven by the phonograph A', $b$ is the fixed part of the distributer; $c$ is a brush fixed to the shaft, $a$, by means of the metal rod, $d$, the parts $a$ $c$ $d$ form the rotary part of the distributer. The brush $c$ passes successively over the contacts 1, 2, 3, 4, etc., placed on part $b$ which is constructed of insulating material; $a_1$ is a shaft driven by the kinematograph, $b_1$ is the fixed part of the receiver B, $c_1$ is a brush fixed by means of a metal rod, $d_1$, to the shaft $a_1$; the parts $a_1$ $c_1$ $d_1$ form the rotary part of the receiver; $1_1$ $2_1$ $3_1$ $4_1$, etc., are the contacts of the receiver, and these contacts are connected by electrical conductors to the corresponding contacts of the distributer.

In Fig. 1 the current supplied at F flows through the metallic mass (not shown in the drawing) of the phonograph, shaft $a$ and brush $c$ to the contacts 1 and $1_1$, brush $c_1$ and to the motor C and rheostat D (which is regulated in such a manner that a strong current will actuate the motor of the kinematograph) and finally to the terminal G. The kinematograph working too fast will actuate the shaft, $a_1$, too rapidly and the brush $c_1$ will arrive at the contact $2_1$ before the brush $c$ has arrived at contact 2. The result is that there is no current in contact $2_1$, so that the motor of the kinematograph slackens in speed and would stop if the brush $c$ did not continue its course. The latter however soon supplies current to the contacts 2 and $2_1$ and the motor starts again, still too fast; it slackens again in speed at the next contact and so on. The dependent machine is thus moved forward by successive impulses that is, it advances step by step. If to the hereinbefore described apparatus, I now provide a second brush $c_2$ (Fig. 1) which is electrically connected through a resistance with the shaft $a_1$ and is besides rigidly fixed by means of an insulating material to the said shaft $a_1$ so as to form a rotating entity $a_1$, $c_1$, $c_2$ then as soon as the too active brush $c_1$ passes over the next inoperative contact $2_1$ the brush $C_2$ arrives at the contact $1_1$ which still receives the current, this current will pass through the new circuit F, $a$, $c$, 1, $1_1$, $c_2$, $a_1$, C, D, G. But the resistance corresponding to the brush $c_2$ reduces this current below that which will maintain the synchronous working, and the kinematograph will tend, instead of stopping as in the preceding case to slacken its speed. Since the resistance introduced through $c_2$ in the circuit of the motor can be varied at will and the rheostat D may be regulated in the same way, the shocks caused by the successive current impulses may be diminished to any desired degree while the current supply to the motor is no longer cut off, which is another advantage.

In Fig. 2 the rotary part of the receiver comprises three different brushes each controlling one circuit. These brushes $c_1$, $c_2$, $c_3$, are rigidly fixed one to the other and to shaft $a_1$ by means of an insulating material and are electrically connected to shaft $a_1$; namely $c_1$ through a resistance $c_2$ through a greater resistance and $c_3$ directly. As in all the figures, $c_1$ is the brush corresponding to synchronous working. The rheostat D is itself regulated in such a way that its resistance, added to the resistance corresponding to the brush, $c_1$, constitutes the resistance convenient to the synchronism of the speeds. The result is that when this synchronism is obtained $c_1$ is always on the contact supplying the current and it itself pushes the dependent machine from one position to the next. Suppose the several apparatus be in the position shown in Fig. 2; then when the kinematograph through any accidental cause such as a diminution of resistance to the pull on the film, or a temporary increase in the potential of the source of electricity, etc., tends to run on ahead the shaft $a_1$ carries the brush $c_1$ on to the next contact 2, which is inoperative. The brush $c_2$ as in the preceding case (Fig. 1 second case) receives a current which is weakened by the resistance connected to the brush, $c_2$, and the kinematograph slackens in speed. But when on the contrary the kinematograph tends to lag behind, the current arrives at contact $2_1$ before the brush $c_3$ has left the said contact. Now as this brush is connected directly i. e. without a resistance to the shaft $a_1$ the movement of the kinematograph is accelerated. The effect of the brushes $c_2$, $c_3$, is thus to throw back the brush $c_1$ on to the operative contact as soon as it tends to leave the same. The brush $c_3$ is not necessarily connected without a resistance to the shaft $a_1$ and any resistance so provided as well as those connected to the brushes $c_1$, $c_2$, may be made as little different from one another as desired for the purpose of rendering the accidental shocks practically inappreciable.

In Fig. 3 the resistances consist of incandescent lamps. The brush $c_1$ connected to a lamp having a certain ohmic resistance, corresponds to synchronous working. The brush $c_2$ to which the current passes through a lamp of greater resistance, produces the slackening of the speed. The brush $c_3$ connected to a lamp of lesser resistance causes the acceleration and the brush $c_4$ which is connected directly to the motor causes the starting thereof. In this figure the circuits controlled by the brushes instead of being electrically connected to the shaft $a_1$ which actuates the rotary part or set of brushes is connected by means of a brush and a ring directly to the motor itself. This is a mere modification of detail. Obviously a lamp may be replaced by a group of lamps for obtaining the desired ohmic resistance, and the same results might be obtained if instead of replacing the resistance by lamps, other electrical signaling devices were introduced in the circuits such as those of the preceding figures the resistances being retained or dispensed with, according to the case. It is however, not absolutely necessary to establish signals in all the circuits of the system; one signal placed in the principal circuit may even appear sufficient, for instance, it may be placed between D and G where it will show that current is flowing or not into the motor. The signaling devices may also be introduced into the already known apparatus in which, like the present invention, the current of the motor is delivered into circuits of different resistances for obtaining automatic synchronism.

Fig. 4 shows sections of Fig. 3 on the lines $x\ y$ and $x_1\ y_1$. H is the wall of the phonograph through which passes the shaft, $a$, driven by the motion thereof; $e$ which is not shown in Fig. 3, is a tubular part fixed on the wall H of the phonograph; $e$ serves as a bearing for the shaft $a$ and as an axle for the part $b$ of the distributer. The conducting wires leading to the contacts 1—2, 3, etc., are made sufficiently long to allow of the limited movement of $b$ on its center. A strong spring $f$ maintains the position of the part $b$ the rotation of which takes place only when an accident not due to the working of the machines has destroyed the synchronism. For instance, if the needle of the phonograph has jumped into a track next to the right track and the kinematograph thereby left behind, it will be sufficient merely to rotate the part $b$ by the handle $x$ in a direction contrary to the arrows shown in Fig. 3. Then the part $b$ going to meet the brush $c$ the current will remain a shorter length of time on the contacts so that the kinematograph which is compelled to follow will rotate faster. It is obvious that the rotation with rough friction of the rod $d$ and the brush $c$ supported thereby around the shaft $a$ would give the same result. In the same figure the flexible shaft $g$ driven by the kinematograph K actuates the shaft $a_1$ whose bearing is situated in the part $b_1$ which is fixed by any suitable means to a convenient part and which besides the contacts $1_1\ 2_1\ 3_1\ 4_1\ 5_1\ 6_1$ is provided with a central ring $h$ electrically connected to the motor C. A part $j$ of insulating material most conveniently shaped as a disk is keyed on shaft $a_1$ and is fitted with the brushes $c_1$, $c_2$, $c_3$, $c_4$ and the corresponding lamps. Another brush $k$, connects the circuits with the ring $h$. The path of the current is through F, shaft $a$, $d$, $c$, 1, $1_1$, $c_1$ incandescent lamp $k\ h$ C D G. $k$ and $h$ may be dispensed with, and the connection between the motor C and the incandescent lamps may be simply established through the mass of the kinematograph K and the flexible shaft $g$. Similarly, part $b$, and brush $c$, of the distributer, the part $b_1$ and the brush or the set of brushes of the receiver may be rendered movable on their center for the purpose of restoring the destroyed synchronism.

Fig. 5 shows a distributer having a number of contacts different from the number of contacts of the receiver. In the preceding examples, the machines to be synchronized must drive the shafts $a$ and $a_1$ in such a manner that when they are in synchronism the shafts $a$ and $a_1$, be in concordance of revolution, namely to each revolution of $a$, there must correspond a revolution of $a_1$. This equality in number of revolutions is not indispensable. As shown in Fig. 5 the contacts $1_1\ 2_1\ 3_1$ of the receiver are electrically connected with contacts 1 2 3 of the distributer, and the contacts 1 and 4, 2 and 5, 3 and 6 of the latter are connected together through the insulating mass $b$. The result is that when $a$ makes one revolution, $a_1$ will make two revolutions because each time the controlling machine advances the distance of one contact the dependent machine will advance the same distance; to make both machines work in synchronism it is merely necessary that the means driving $a_1$ shall cause this shaft to rotate for instance twice as fast as in the case of Fig. 2 all the other speeds remaining the same. Other relations may be employed between the number of contacts taking account of the electrical communications to be established and the relative speeds of the shafts of the machines to be synchronized, that drive the shafts $a$ and $a_1$.

Fig. 5 shows that the resistances can be controlled by the distributer as well as by the receiver. $c$ corresponds to synchronous working; when $c^1$ runs too fast it arrives at contacts $2_1$ where it meets a current supplied by $c_5$, and passing through a great resistance, the dependent machine thus slackens its speed. If $c_1$ runs too slowly the brush $c_5$ supplies to it at contact $1_1$ before it has left the same, a great current which accelerates its speed. Fig. 5 shows also the detail of an interrupter which allows the person operating the phonograph to control the starting of both apparatus; H is the wall of the phonograph through which the shaft $a$ passes. $l$ is the plate receiving the disks; $m$ is the axle of said plate; $m$ represents also the metallic mass of the phonograph connected on one hand to the shaft $a$ by continuity and on the other hand by a conducting wire to the pivot $n$ of the stop lever that is provided with metal rod $p$ which maintains the plate $l$ in the position of rest. The contact $q$ is electrically connected to the terminal F so that when the stop lever $p$ in releasing the plate $l$ allows the phonograph to be set in motion, electrical connection is established between $n$ and $q$ through lever $p$. The friction of $p$ on $q$ must be sufficient to overcome the attraction of the spring $r$. The stop lever $p$ may be arranged to act on any part of the phonograph other than the plate and the phonograph itself may be a cylinder phonograph without departing from this principle. Instead of being placed on the same rod, the stop lever and the interrupter may be arranged near one another and connected by one and the same operating rod. The interrupter may also be separate from the stop lever and placed at any convenient point of the circuit, near the kinematograph for instance. The starting of the phonograph will thus be produced after a signal or automatically by the withdrawal of the stop lever by means of an electromagnet. Fig. 6 shows an arrangement of this kind. In this figure the same references indicate the same parts as in Fig. 5. The interrupter L sends out a current which causes the motor C to start and which passing at the same time the electromagnet $s$ draws back the brake lever $p$ which constitutes its armature and keeps this lever in the drawn back position so long as the motor $c$ and consequently the kinematograph are in motion. From the parts $a$ and $a'$ onward the connections of Fig. 6 are the same as in the preceding figures. In the same manner as the devices shown in the other figures, the several apparatus shown in Figs. 5 and 6 relating to the starting of the phonograph may be applied to other machines.

Although the apparatus shown in Fig. 4 allows of restoring the destroyed synchronism and in consequence of the use of belts for driving the rotating parts of the distributer and receiver it is preferred to employ non-slipping gearing such as toothed wheels pitch chains and the like.

It is to be understood that the various apparatus may be constructed differently, that the rotating parts may be rendered stationary and vice-versa, that the contacts as well as the regulating circuits may be different in number from those stated, that the resistances and signals may be stationary instead of being placed on rotating parts, etc., and that the hereinbefore described examples are to serve solely by way of illustration without limiting the present invention.

Having now described and ascertained the nature of my said invention, I declare that what I claim is:

1. The combination of a controlling machine, a rotary distributer driven by said controlling machine, a dependent machine driven by an electric motor, a rotary receiver driven by said dependent machine, electrical circuits in which are comprised the successive contacts of the distributer and the successive contacts of the receiver, said electrical circuits being in series with the motor, resistances of different values automatically included in the said circuits and said resistances permitting an electric current to flow through said electric circuits as specified.

2. The combination of a controlling machine, a rotary distributer driven by said controlling machine, a dependent machine driven by an electric motor, a rotary receiver driven by said dependent machine, electrical circuits in which are included the successive contacts of the distributer and the successive contacts of the receiver, a resistance permitting the passage in the circuits of a current driving the motor too rapidly, the effect of which being therefore to continually push the brush of the receiver onto the following contact which receives no current as specified.

3. The combination of a controlling machine, a rotary distributer driven by said controlling machine, a dependent machine driven by an electric motor, a rotary receiver driven by said dependent machine, electrical circuits in which are included the successive contacts of the distributer and the successive contacts of the receiver, a first resistance permitting the passage in the circuits of a current driving the motor too slowly, a second resistance permitting the passage in the circuits of a current driving the motor too rapidly, the effect of the latter being therefore to continuously push the brush of the receiver onto the following contact which receives the current governed by the first resistance as specified.

4. The combination of a controlling machine, a rotary distributer driven by said controlling machine, a dependent machine driven by an electric motor, a rotary receiver driven by said dependent machine, electrical circuits in which are included the successive contacts of the distributer and the successive contacts of the receiver, a resistance affording the passage of a current giving the right working for synchronism a resistance permitting the passage of a current driving the motor too rapidly, a resistance permitting the passage of a current driving the motor too slowly, said resistances being automatically included in the electrical circuits, the effect of both last resistances being to push the rotary part of the receiver or to retain it on the contact receiving the right current through the first resistance as specified.

5. The combination of a controlling machine, a rotary distributer driven by said controlling machine, a dependent machine driven by an electric motor, a rotary receiver driven by said dependent machine, electrical circuits in which are included the successive contacts of the distributer and the successive contacts of the receiver, resistances comprising electric signals, said resistances being included automatically in the said circuits, and permitting the passage of an electric current through them as specified.

6. The combination of a controlling machine, a rotary distributer driven by said controlling machine, said rotary distributer having its contacts movable by hand around their axis whereby the restoration of the synchronism is obtained when destroyed, a dependent machine driven by an electric motor, a rotary receiver driven by said dependent machine, electrical circuits in which are included the successive contacts of the distributer and the successive contacts of the receiver, resistances of different values automatically included in the said circuits and said resistances permitting the passage of an electric current through said electric circuits as specified.

7. The combination of a controlling machine, a rotary distributer driven by said controlling machine, said rotary distributer having its set of brushes movable by hand around their axis, a dependent machine driven by an electric motor, a rotary receiver driven by said dependent machine, electrical circuits in which are comprised the successive contacts of the distributer and the successive contacts of the receiver, resistances of different values automatically included in the said circuits and said resistances permitting the passage of an electric current through said electric circuits as specified.

8. The combination of a controlling machine, a rotary distributer driven by the said controlling machine a dependent machine driven by an electric motor, a rotary receiver driven by the dependent machine, the contacts of said receiver being movable by hand around their axis whereby the restoration of destroyed synchronism is obtained, electrical circuits in which are included the successive contacts of the distributer and the successive contacts of the receiver, resistances of different values automatically included in the said circuits and said resistances permitting the passage of an electric current through said electric circuits.

9. The combination of a controlling machine, a rotary distributer driven by said controlling machine, a dependent machine driven by an electric motor, a rotary receiver driven by said dependent machine, the set of brushes of said receiver being movable by hand around their axis, electrcal circuits in which are included the successive contacts of the distributer and the successive contacts of the receiver, resistances of different values automatically included in the said circuits and said resistances permitting the passage of an electric current through said electric circuits as specified.

10. The combination of a controlling machine, a rotary distributer driven by said controlling machine, a dependent machine driven by an electric motor, a receiver driven by said dependent machine, the receiver having a number of contacts, electrical circuits in which are comprised the successive contacts of the distributer and the successive contacts of the receiver, resistances of different values automatically included in the said circuits and said resistances permitting the passage of an electric current through said electric circuits.

11. The combination of a controlling machine, a rotary distributer driven by said controlling machine a dependent machine driven by an electric motor, a rotary receiver driven by said dependent machine, said receiver having a number of contacts different from the distributer, electrical circuits in which are comprised the successive contacts of the distributer and the successive contacts of the receiver, resistances of different values automatically included in the said circuits and said resistances permitting the passage of an electric current through said electric circuits as specified.

12. The combination of a controlling machine, a rotary distributer driven by the said controlling machine, the stationary part of said distributer being the contacts, a dependent machine driven by an electric motor, a rotary receiver driven by said dependent machine, electrical circuits in which are included the successive contacts of the distributer and the successive contacts of the receiver, resistances of different values automatically included in the said circuits and said resistances permitting the passage of an electric current through said electric circuits as specified.

13. The combination of a controlling machine, a rotary distributer driven by said controlling machine a dependent machine driven by an electric motor, a rotary receiver driven by said dependent machine, the stationary part of the receiver being the set of brushes, electrical circuits in which are included the successive contacts of the distributer and the successive contacts of the receiver, resistances of different values automatically included in the said circuits and said resistances permitting the passage of an electric current through said electric circuits as specified.

14. The combination of a controlling machine, a rotary distributer driven by said controlling machine, a dependent machine driven by an electric motor, a rotary receiver driven by said dependent machine, electrical circuits in which are included the successive contacts of the distributer and the successive contacts of the receiver, resistances of different values said resistances being carried by one of said rotary elements and automatically permitting the passage of an electric current through themselves and the electrical circuits as specified.

15. The combination of a controlling machine, a rotary distributer driven by said controlling machine, a dependent machine driven by an electric motor, a rotary receiver driven by said dependent machine, electrical circuits in which are included the successive contacts of the distributer and the successive contacts of the receiver, resistances of different values, said resistances being carried by the rotary part of the distributer and automatically permitting the passage of the current through themselves and the electrical circuits as specified.

16. The combination of a controlling machine the starting thereof being governed by a stop lever, a rotary distributer driven by said controlling machine, a dependent machine driven by an electric motor, the interrupter of the circuit of said motor being connected with the stop lever of the controlling machine, a rotary receiver driven by said dependent machine, electrical circuits in which are included the successive contacts of the distributer and of the receivers, resistances of different values automatically included in the said circuits, said resistances permitting the passage of an electric current through said electric circuits as specified.

17. The combination of a controlling machine with a stop brake lever of which the motion is governed by an electromagnet, a rotary distributer driven by said controlling machine, a dependent machine driven by an electric motor, a rotary receiver driven by said dependent motor, electrical circuits in which are included the successive contacts of the distributer and of the receiver, resistances of different values automatically included in the circuits, said resistances permitting the passage of an electric current through said electric circuits and the interrupter of current controlling at the same time the starting and stopping of the motor of the dependent machine and the motion of the stop brake lever of said controlling machine as specified.

In testimony whereof I affix my signature in presence of two witnesses.

EUGÈNE LOUIS AMÉDÉE LERTOURNÉ.

Witnesses:
H. C. COXE,
EDWARD MAY.